United States Patent [19]
Itamochi

[11] Patent Number: 6,154,663
[45] Date of Patent: Nov. 28, 2000

[54] PORTABLE TELEPHONE COMMUNICATIONS SYSTEM

[75] Inventor: Takeshi Itamochi, Fukuoka, Japan

[73] Assignee: Golden Link, Ltd., Kowloon, The Hong Kong Special Administrative Region of the People's Republic of China

[21] Appl. No.: 09/295,085

[22] Filed: Apr. 20, 1999

[51] Int. Cl.[7] .................................................. H04B 1/38
[52] U.S. Cl. ..................... 455/569; 455/575; 455/574; 455/212; 455/222; 379/420; 379/421; 379/431; 381/110
[58] Field of Search .......................... 455/550, 559, 455/568, 575, 572–574, 90, 352, 344–346, 350–351, 343, 127, 212, 214, 221, 218, 222; 379/420–422, 431–432; 381/110

[56] References Cited

U.S. PATENT DOCUMENTS

| | | | |
|---|---|---|---|
| 4,905,270 | 2/1990 | Ono | 455/90 |
| 4,975,964 | 12/1990 | Hochstein | 381/110 |
| 5,832,390 | 11/1998 | Irvin | 455/569 |

*Primary Examiner*—Doris H. To
*Attorney, Agent, or Firm*—Jenkens & Gilchrist

[57] ABSTRACT

A portable telephone communications system has a portable telephone terminal (300) and a repeater unit (100), and a remote receiver unit (200), wherein the repeater unit (100) includes a main power supply control device which includes detection means triggered by a signal from the telephone terminal arising on receipt of an incoming call, and including infra-red transmission means for transmitting the signal as a frequency-modulated signal to the remote receiver unit; the remote receiver unit (200) includes an infra-red receptor, demodulation means (205) and means for outputting the demodulated signals as audible voice signals, and further comprises a noise level comparator (209*d*) which compares the voltage of noise generated when no infra-red signals are received with a predetermined level and delivers an output signal when said voltage exceeds the predetermined level, and a time counter (210) which outputs a reset signal when the output from the noise comparator has been generated for a predetermined time interval, and a second power supply control device (212) which controls the power supply to the remote receiver unit.

12 Claims, 9 Drawing Sheets

1

PORTABLE TELEPHONE COMMUNICATIONS SYSTEM

BACKGROUND OF INVENTION

The present invention relates to a portable telephone communications system which has particular applicability for use in automobiles, although its use is not necessarily restricted thereto.

Many types of portable telephone communications systems have been developed for assisting car drivers in the portable telephone communications while driving. These portable telephone communications systems generally consist of a repeater unit (main body) which is connected to the portable telephone terminal and a cordless remote receiver unit (earphone) which is connected to the main body of mobile telephone by infra-red rays and put over caller's ears. Such type of portable telephone communications systems are called "hand-free communications system", "hands-free communications system", or "cordless communications system", etc.

Japanese Patent Application HEISEI-09-2734855, for example, discloses an invention of hands-free type communications system which enables caller to off-hook for starting/receiving a call, to on-hook after the communication is over by the operation of the switch installed in the communications device which is put over the caller's ears. However, in this system, as the power to the main body is always supplied from the car battery through cigarette lighter outlet and that of the earphone is always supplied from built-in battery (such as dry battery), both require caller's hand operations for turning off the power switch. Further, it specifies only that the on/off-hook control switch installed in the earphone works to turn on the switch when pressed once and turn off when pressed once again. Based on this, we assume that after the communication is over, the system requires caller not only manual operation on the switch installed over caller's ear but also frequent switch-off operation of the power to the earphone for longer life of the battery. Consequently, caller needs to pay attention all the time to the switching operation of both hook and power switches.

Japanese Patent Journal HEISEI-9-162961 discloses an invention of cordless communications system, utilizing infra-red ray. It describes only the transmitting/receiving action by infra-red ray during communications but not controlling operation for starting and terminating the communications or technical details of devices. In this system, one-way PTT switching system is adopted for the transmission/reception of communication and the simultaneous two-way communications as with normal telephone is not possible. It is used rather in the same way as with transceiver. Accordingly, the transmission/reception switching, manual PTT operation is required. Although there is no details mentioned on the power supply to the transmission/reception circuit unit which is put on the caller, it is assumed that the power is supplied by battery, such as battery cells. Consequently, manual operation of power switch is required for turning off the power switch. To this end, caller must always pay attention to the operation of both PTT and power switches.

Japanese Patent Journal HEISEI-4-249433 discloses an invention of amplifier to set a portable telephone and head set which enables hands-free communications from the amplifier, using infra-red rays. It is explained that the invention enables hands-free communications, utilizing infra-red rays by frequency modulation. The power to amplifier in this invention is supplied from car battery, and it is assumed to be either type of power switching systems which need to be on for initiating a call or left on at all time. Further although there is no mention on the power supply to the head set, it is assumed that the power is supplied always from battery (such as battery cells) and it requires call's manual operation to turn off the power. In this journal, it is only mentioned that the adoption of infra-red ray communications using said frequency modulation enables such a hands-free communications function. It is assumed, consequently, that in this system, the power supply needs to be controlled either with manual switch on the amplifier to turn on or left on at all time without providing any power switches, where the energy-saving is essentially impossible. The power of head-set also needs to be manually switched off. Therefore, caller (driver) is obliged to always pay attention to the power switching operation. Further, with the adoption of frequency modulation method, high-level output noise is generated when no signals are received. However, considering that there is no special measures to take mentioned in the journal, it is assumed that caller cannot avoid hearing the noise. Consequently, it is inevitable for caller to operate the switch of the head-set power to turn off as soon as the communication is over.

Further, Japanese Patent Journal SHOWA-56-152343 discloses cordless amplifier telephone system. It is specified that this telephone system enables to control the communication at a distance by the transmitter unit which is connected to the dial, hook switch and microphone. Based on the specification, the starting of call by dial needs dialling operation while pressing the hook switch installed on the transmitter unit, and it is assumed that complicated one-hand operations is indispensable in this system. If that is the case, as the operation can be easier when it is not cordless, it would be difficult to apply this invention in a car. Besides, as to dialling signals, hook signals and voice signals which are necessarily supplied at the starting of call, it only specifies that dialling signals, on-off hook signals and voice signals generate signals, "after being supplied to the repeater . . . are transmitted . . . transmission media, such as magnetic waves, sound and light".

Japanese Patent Journal HEISEI-7-28749 discloses an invention of adapter to be installed in a car for portable telephone communications in order to enable car driver hand-free communications. By installing this adapter to the portable telephone, the microphone and speaker which are already installed in the adapter can be connected to the input/output terminal of the portable telephone, and the hand-free communications function can be provided. Based on the description that the microphone is a condenser microphone, it is assumed with this adapter that it is not possible for car driver to immediately respond to the received call unless the power is always left on. Further, when installed in a car, the adapter needs at least separate wiring for speaker and microphone in the car. If the wiring is long or incidentally so long as it easily picks up the electrical transmission waves from radio broadcasting station or wireless radio station, a certain current which corresponds with broadcasting from the radio broadcasting station or communications from the wireless radio station is induced by such broadcasting waves or radio communication waves, and, as a result, so called inference may be occurred.

Besides, it is mentioned that car driver can respond to received calls by turning on the communication switch which is installed on the portable telephone itself. Based on this, it is assumed that car driver needs to operate the communication switch, while visually checking the portable telephone or groping for the switch. It is also mentioned that the microphone installed on the adapter can be wireless, which does not specify anything more but "The microphone may be wireless microphone".

With the proliferation of portable telephones, people's usage of portable telephones, while driving a car is increasing. On the other hand, the rapid increase in number of accidents caused by the use of portable telephones while driving a car is becoming a centre of attention of the public. In Japan, the Traffic Bureau of the National Policy Agency reported results of its scientific research to the National Public Safety Commission on Mar. 19, 1998. The report says that one-hand driving makes the wheel operation unsteady and driving unsafe, which may easily lead to accident (source: Asahi Evening of the same day).

The report also says that portable telephone communications systems by which is meant any type of hands-free communications system consisting of main body (transmitter unit) and earphone (remote receiver unit), enabling cordless communications as mentioned above is "considered to be effective, to a certain extent, for preventing car drivers from taking their eyes off the road", however, the time during which caller ("Caller" hereinafter means car driver who is communicating on a portable telephone while driving) is preoccupied with the operation of such portable telephone communications systems for responding to received calls is 1.66 seconds in average. If driving at 40 km/hr, the car advances about 18.4 m in such instance. The report warns of the dangers of about 20 m advance of the car without visual checking of the conditions in front of the driving car, while the driver is taking eyes off the road for just 1 second.

The report further informs that accidents occurring when a car driver receives calls account for 41% of total traffic accidents related to portable telephone operations, and receiving calls became the top reason of traffic accident. At the start of communicating on a portable telephone, accidents can be prevented from occurring by stopping the car at the shoulder of road to do such operations. However, received calls generally involve noisy alarm sounds, etc of portable telephone and urge car drivers to respond to the calls, and they tend to immediately respond risking taking their eyes off the road for an instant.

At this time, as an electricity-saving-conscious car driver tends to keep the power switch of said earphone off, he would need to grope for power switch, turn it on, and then press the communication button on the portable telephone to respond to the received call. In such operation on conventional systems, car drivers tend to press the power switch twice by mistake, and unintentionally terminate unfinished communication or take time to respond to the received call because of the facts that: (1) conventional systems generally use toggle switch for power switch, (2) the position of power switch cannot be found so easily as it is located over car driver's ear, and (3) the car driver tends to forget whether he had turned it off after the communication is over. As a result, the car drivers are too much distracted by minding about the power-switch operation and this may easily cause a traffic accident, which has become a serious social issue.

Conventional systems necessarily require some kind of manual turn-off operation after the communication is over, if power switch of earphone is designed to be pressed once to turn on the power, otherwise the power is left on after it has been turned on. Also for a car driver who is not conscious of electrical saving, there is a disadvantage of frequently required battery changes because batteries could be wasted due to failure of power-off operation as battery of the earphone normally runs out very quickly in a short time.

In the case where the main body of mobile telephone and earphone are connected with infra-red ray communications by the frequency modulation, there is a loud output noise when no signals are received. Consequently, caller needs to turn off the switch as soon as the communication is over or adjust the sound volume. Because of such operations, car drivers tend to be preoccupied increasing the number of traffic accidents in the way as described above.

Further, as the power of the main body of the mobile telephone (especially, of the type that is installed in the car) is normally supplied from car battery through a cigarette lighter outlet, such hands free communications system cannot be used when the car engine is stopped. On the other hand, when the power is supplied from dry batteries built in the system, there is a disadvantage that caller needs to change batteries frequently, as they run out quickly if the power of the main body is left on, which may cause more trouble of maintenance.

For avoiding such occurrences, the caller must diligently turn off the power of main body. However, this causes the problem of increased risk of car drivers taking their eyes off the road, and, further, as they cannot immediately respond to received calls, they tend to lose concentration on driving of the car.

There is thereby a need for a system which addresses these problems.

More particularly there is a need for a portable telephone communications system which is designed to enable the communications on a portable telephone without requiring two-hand operation, to thereby make driving safer. Further, there is a need for a portable phone communications system which enables caller to turn on the power of remote receiver unit for responding to received call by only one press of the power switch button installed in the remote receiver unit (earphone) which is put over caller's ear, and the power to be turned offer automatically so that no particular power switching operation is required after the communication is over.

SUMMARY OF THE INVENTION

According to a first aspect of the present invention there is provided a portable telephone communications system having a portable telephone terminal and a repeater unit, and a remote receiver unit, wherein: the repeater unit includes a main power supply control device which includes detection means triggered by a signal from the telephone terminal arising on receipt of an incoming call, frequency modulating means for receiving signals representative of a remote caller's voice from the telephone terminal, and converting them into a frequency modulated signal, and including infra-red transmission means for transmitting said frequency-modulated signal to the remote receiver unit; the remote receiver unit includes an infra-red receptor, demodulation means and means for outputting the demodulated signals as audible voice signals, and further comprises a noise level comparator which compares the voltage of noise generated when no infra-red signals are received with a predetermined level and delivers an output signal when said voltage exceeds the predetermined level, and a time counter which outputs a reset signal when the output from the noise comparator has been generated for a predetermined time interval, and a second power supply control device which controls the power supply to the remote receiver unit, and is arranged to switch off the power on output of a reset signal from the time counter.

Preferably, noise reduction control means is provided in the remote receiver unit, triggered by the output signal from the noise comparator.

In a preferred embodiment the main power supply control device comprises comparator means to compare the voltage of signals from the telephone terminal with a predetermined voltage, and when said voltage exceeds the predetermined voltage as occurs on receipt of an incoming call to output said triggering control signal. The main power supply control device may be adapted to switch off power supply to the repeater unit on termination of triggering control signals as occurs when a call is finished.

The receiver unit may include a reset device comprising a logic controller adapted not to provide reset signals to said second power supply control device if infra-red signals are being received. The logic controller may be adapted to provide a reset signal to said second power supply control device when the infra-red signals stop for a predetermined period, to thereby switch off the power supply. When the signals stop however for a short period less than the predetermined period, as may happen when there is a brief interruption in the infra-red beam, the power is not however switched off.

The repeater unit may be provided with a wave detector which detects emitted radio waves from the portable telephone terminal and rectifies them into a direct current signal, the first main power supply being triggered by the voltage output from the wave detector.

In a further aspect the invention provides a portable telephone communications system, comprising a repeater unit, which converts voice signals output at a portable telephone terminal into infra-red signals by frequency modulation and transmits them to the terminal on the other end of the communication, and a remote receiver unit which receives the infra-red signals, converts them back into voice signals by the demodulation and outputs them as an audible signal wherein the repeater unit has a voice input device to receive caller's voice, and a first main body power supply control device which detects the receipt of calls at the portable telephone terminal being triggered by control signals from the portable telephone terminal, and supplies electrical power to the repeater unit according to the detection results, the remote receiver unit including a noise level comparator which compares the voltage of noise elements outside the voice band generated when no infra-red signals are received with that of a predetermined voltage level, and a time counter which outputs reset signals when there is a continuous flow of outputs from the noise level comparator for a period longer than a predetermined period, a reset device whose logic conditions invert upon the input of signals from the time counter, and a second main body power supply control device which controls the power supply to the remote receiver unit.

In a further aspect the invention provides a portable telephone communications system, comprising a repeater unit, which converts voice signals output from a portable telephone terminal into infra-red signals by frequency modulation and transmits them to the terminal on the other end of the communication, and a remote receiver unit which receives the infra-red signals, converts them back into voice signals by the demodulation and outputs them as an audible signal, wherein the repeater unit has a voice input device for receiving the caller's voice, a wave detector which detects transmitted radio waves from portable phone and rectifies these into direct current, and a first main body power supply control unit which detects the receipt of calls at the portable telephone terminal, being triggered by the voltage output from the wave detector, and supplies electrical power to the repeater unit according to the detection results, the remote receiver unit having a noise level comparator which compares the voltage of noise elements outside the voice band generated when no infra-red signals are received with that of predetermined voltage level, and a time counter which outputs reset signals when there is a continuous flow of outputs from the noise level comparator for a period longer than a predetermined period, a reset device whose logic conditions invert upon the input of signals from the time counter, and a second main body power supply control device which controls the power supply to the remote receiver unit.

BRIEF DESCRIPTION OF THE DRAWINGS

Embodiments of the invention are now described, by way of example only, with reference to the following drawings in which.

DETAILED DESCRIPTION OF THE PREFERRED EMBODIMENT

The "portable telephone terminal" hereby means any portable telephone terminal or hand-set such as, so-called cellular type telephone terminal, mobile telephone terminal, car telephone terminal, and PHS. Especially, the "cellular type" includes all types, such as TACS, TDMA, CDMA, the "mobile telephone" includes such type of telephone terminal as may be used for any kind of radio system, such as MCA system (Multi-Channel Access), radio system for public services and general business as well as for personal use.

Figure 1:
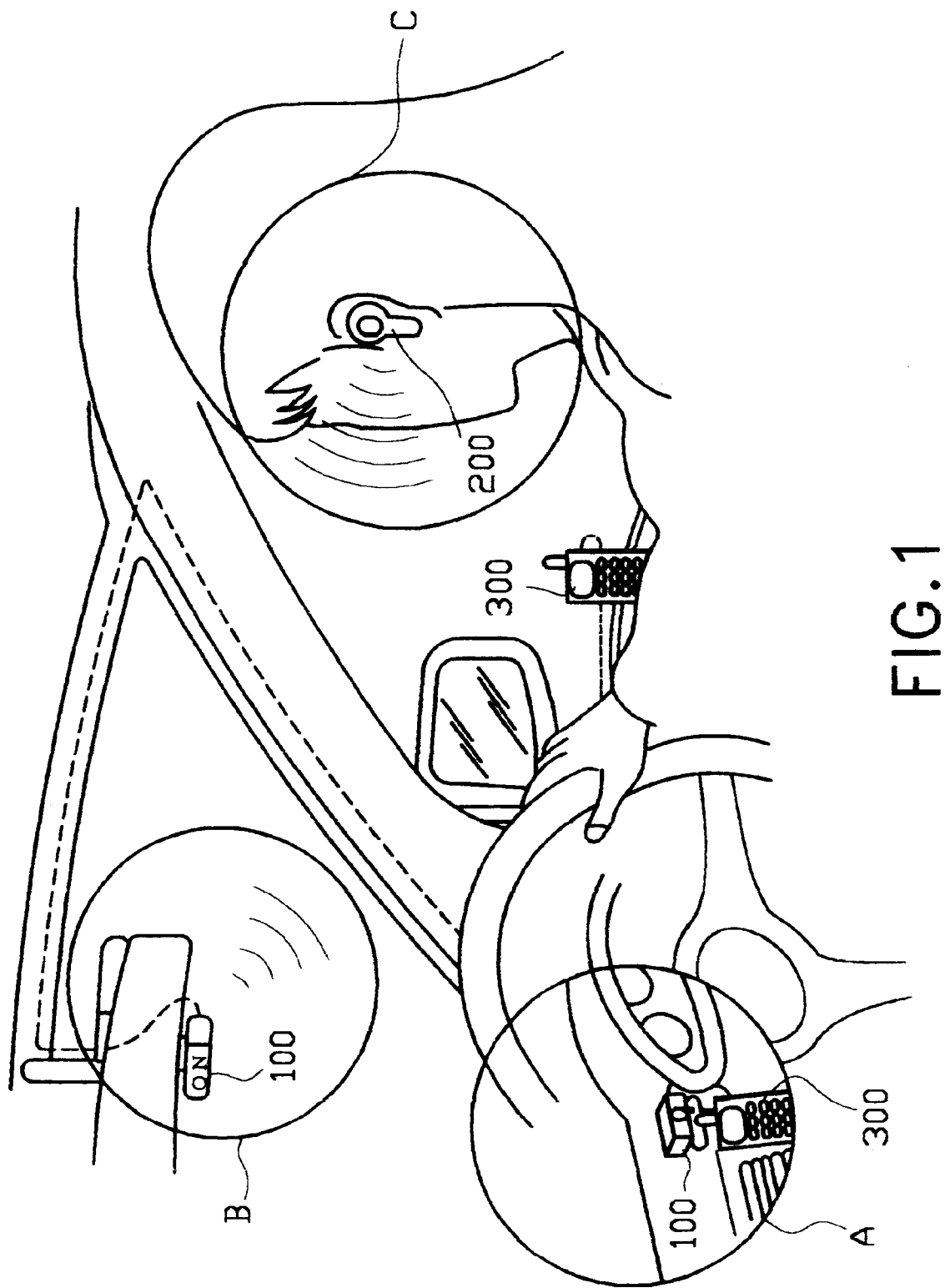
FIG. 1 illustrates the components of the portable telephone communications system in accordance with an embodiment of the invention when in use in a car.

FIG. 1 shows an example of an application of the portable telephone communications system in this invention, for use in an automobile. The system consists of a repeater unit 100 which can be installed on a dashboard or control panel in the car, back mirror, sun visor and so on, and a remote receiver unit 200 which receives infra-red signals sent from the repeater unit 100. Repeater unit 100 is connected to portable telephone terminal 300 by cable C1, and is a unit to convert voice outputs from portable telephone terminal 300 into infra-red signals and transmit them to remote receiver unit 200. Remote receiver unit 200 may be put over a driver's ear and is a unit to convert by frequency demodulation, the infra-red signals received from repeater unit 100 back into voice signals and output an audible voice signal. The part encircled with A in FIG. 1 shows repeater unit 100 installed on the cabinet inside the car and connected to portable telephone terminal 300. The part encircled with B shows repeater unit 100 installed beneath a rear view mirror and connected to portable telephone terminal 300 which is installed on the window on the driver's side. The part encircled with C shows car driver wearing remote receiver unit 200 over his (her) ear.

Repeater unit 100 has a built-in voice input device in the form of a microphone 100h. Voice input device 100h serves to convert caller's voice signals into electrical signs and transfer them to portable telephone terminal 300 through cable C1 so that the other party to the call can hear the caller's voice.

The power to repeater unit 100 can be supplied from a first rechargeable built-in battery 111, however, it is preferably supplied from car battery through cigarette lighter outlet cable C2 when repeater unit 100 is used in the car. It can be also supplied from a conventional power outlet socket in the home or workplace when used in such an application, using AC adapter. The power to remote receiver 200 is supplied from second built-in battery 213 in the same way. It has at least a power switch to turn on the whole unit.

Figure 2:
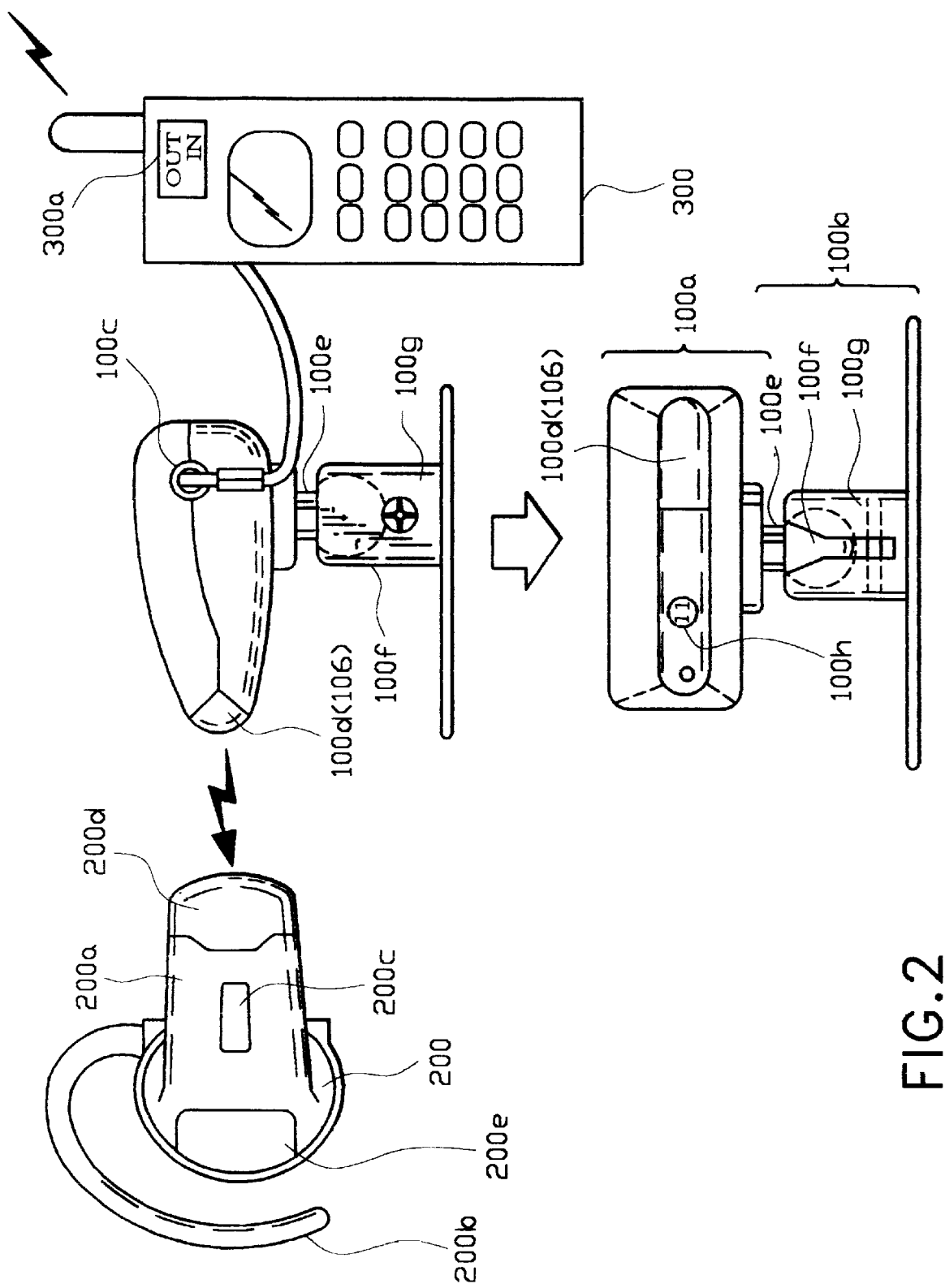
FIG. 2 illustrates in further detail the components of the system.

FIG. 2 shows a general view of the hardware composition of the portable telephone communications system. Repeater unit 100 described above consists of a main body 100a and a base 100b. Main body 100a has a voice signal terminal 100c on the side (it can be on the right, left or back). Voice signal terminal 100c works as an interface to connect main body to input/output terminal 300a. It also serves as a jack, connector, etc to pass the output voltage representative of voice signals received from the other party to the call and output voice signals related to the caller's voice to portable telephone terminal 300 along the cable C1. For cable C1, those cables which are on the market for head set or for communications system can be used. Those of non-standard type can be also used as long as they have a standard jack on both ends. On the front of main body 100a, infra-red ray transmitting window 100d is provided. Through the window 100d, repeater unit 100 transmits infra-red signals converted from the output voltage of voice signals which were entered from said portable telephone terminal 300. The body of the repeater unit 100 may be made of any kind of materials, such as plastic, synthetic resin, etc, though highly heat resistant material is preferable.

Base 100b is supported by an axis 100e, at the end of which a rotary ball 100f is provided. Rotary ball 100f is fixed to rotary ball supporting leg 100g. Where, as the rotary ball supporting leg 100g holds the rotary ball 100f in its inside with a certain force of friction and pressure, main body is normally attached to base 100b safely and steadily. Although the main body 100a is fixed to supporting leg, it is freely movable to any direction or inclination by the movement of rotary ball within the set range of rotation.

Remote receiver unit 200 mentioned above is designed to be put over caller's (car driver's) ear. The preferable shape is shown in FIG. 2. Main body 200a, therefore, is provided on the side with a fixture 200b suitable for putting over the ear. It is provided with a infra-red ray receiving window 200d at the end. Fixture 200b can be made of such materials as rubber, memory alloy covered with a film and so on, which are rigid to certain extent and at the same time flexible to easily reshape by hand. Further, the structure of infra-red ray receiving window 200d may be the same as that of infra-red ray transmitting window 100d of repeater unit 100.

Remote receiver unit 200 can accommodate the second built-in battery 213 of the same type as the first built-in battery 111, in battery part 200e. The power supplied from the second built-in battery 213 is distributed to the whole circuit of remote receiver unit 200 when power supply button 200c is pressed down and remote receiver unit 200 becomes ready to receive infra-red signals to be transmitted from repeater unit 100. However, when no infra-red signal is received from repeater unit 100 for a certain period of time, the power of remote receiver unit 200 will be automatically turned off in the process as described below.

Figure 3:
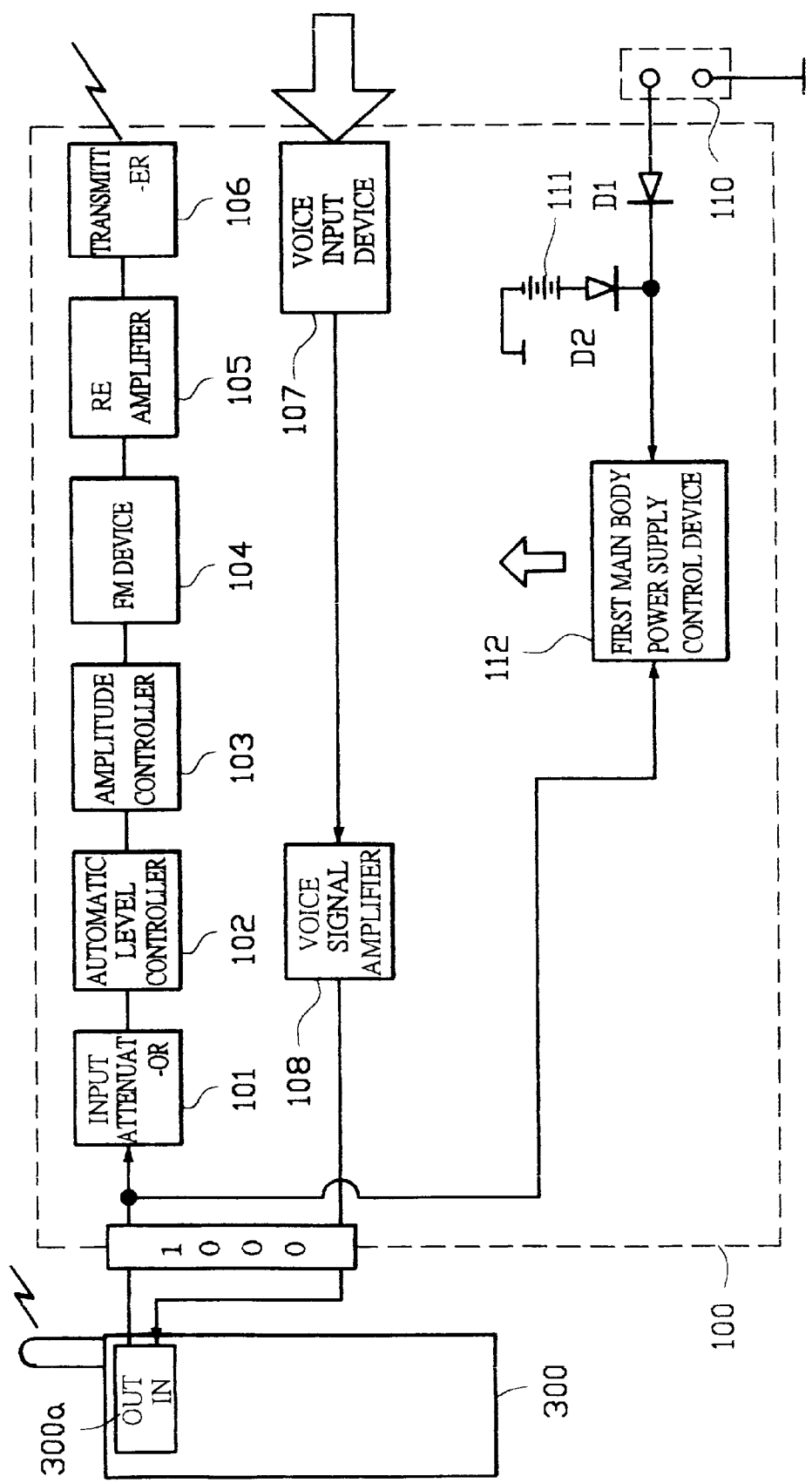
FIG. 3 is a schematic diagram of the elements of a repeater unit.

In this paragraph, we describe further details of repeater unit 100. FIG. 3 shows the operation by way of a block diagram. First, we explain the power system. The power to repeater unit 100 may be supplied from external power supply source 110 through the cigarette lighter outlet provided in the car by means of cigarette lighter outlet cable C2. Portable telephone terminals 300 already on the market normally generate output voltage (eg about 2.6 volt) at voice signal input/output terminal 300a, when receiving incoming signals. The part of the voice signal output is transmitted along cable C1 from voice signal input/output terminal 300a to first main body power supply control device 112 via voice signal terminal 100c. A part of voice signal output voltage to be supplied to the first main body supply control device 112 is referred to as a "control signal" from time to time in this specification.

First main power supply control device 112, then, compares the voltage of the input control signals with the standard voltage (eg 2.6 volt). When the former exceeds the latter as a result of comparison, first main body power supply control 112 detects that portable telephone terminal 300 has been activated (received a call). Then, recognizing the detected result as a trigger signal, it starts distributing the power supplied from external power source 110 mentioned above to the whole circuit of repeater unit 100. By this process, repeater unit 100 is automatically switched on upon the receipt of signals.

As shown above, repeater unit 100, when turned on, converts the voice signals of the voice of other party to the call into infra-red signals and transmits them to remote receiver unit 200 mentioned above. The part of the voice signal output voltage, which was generated at voice signal input/output terminal 300a upon the receipt of call, is attenuated to an appropriate level by input attenuator 101 of repeater unit 100 and entered into automatic level controller 102. Automatic level controller 102 is designed to equalize the differential which may arise from the difference in the level of voice signal output among products of different manufacturers. For this device, so-called ALC circuit (Automatic Level Control Circuit), consisting of level controller, voice signal rectification diode and amplifier, etc can be used.

After passing automatic level controller 102, the peak level of the voice signal is limited to a certain level by amplitude controller 103. This is an amplitude controlling circuit to suppress unnecessary expansion of the occupation band width in frequency modulation (FM) in the later process. For this part, a limiter amplifier and so on can be used or similar alternative devices.

Further, the voice signals are entered into FM device 104 which changes equivalent reactance of the device, according to the received sound level of the voice of other party to the call. By changing the equivalent reactance of RF oscillator 105, oscillating RF frequency is directly frequency modulated. This modulated RF signal is amplified by RF amplifier 105, which then controls output of infra-red transmitter 106 which emits the signals as infra-red signals. RF oscillator and amplifier 105 consists of a RF oscillation circuit (with oscillation frequency of eg 0.5 MHz), power transistor, and electrical amplification circuit, such as a FET. Besides, transmitter 106 operates to send out infra-red signals switched by the RF signals which have undergone the frequency modulation. For this part, a light emitting element, such as infra-red LED can be used but the use is not restricted to these devices.

The voice input device 107, for which condenser microphone and equivalent can be used, collects the voice of caller and converts this into electrical signals. The electrical signals, after being electrically amplified at voice signal amplifier 108 travel along cable C1 and enter voice signal input/output terminal 300a of portable telephone terminal 300. Voice signal output terminal 300a is the terminal to which a conventional cabled head-set, ear phone, microphone, etc as currently on the market can be connected, and works as an interface, such as jack, connector relating to input and output of voice signals.

First built-in battery 111 can be storage battery, such as dry battery, rechargeable battery or solar battery, etc. It is a backup power supply to maintain or support the operation of repeater unit 100 in the case of power cut or failure. It does not need to be built in repeater unit 100. Now, we described further details of the power supply system. FIG. 4B shows in more detail the configuration of the first main body power supply controller 112, first built-in battery 111 and external power supply source 110. Suppose the power to repeater unit 100 is supplied by first built-in battery 111 and external power supply source 110 is not connected physically. Further, first main body power supply controller 112 is provided with a power supply jack, such as DC jack, which has at least a first contact 112a, a second contact 112b and third contact 112c.

Suppose the power of repeater unit 100 is initially off. Namely, third contact 112c is in contact with contact 112b of the configuration as in FIG. 4(B), and the current from first built-in battery 111 is not supplied to the whole device as the transistor Tr2 is still off. As mentioned above, when received a call, portable telephone terminal 300 first activates sound alarm, urging the caller (car driver) to respond to the call. At this moment, an output voltage (the voltage varies or fluctuates, depending on the type of portable telephone) is generated at voice signal input/output terminal 300a of portable telephone terminal 300. Then, the output voltage (the control signals mentioned above) is entered into main body power supply controller 112, namely, portable telephone terminal 300 detects the receipt of a call. Part of the output voltage is entered into transistor Tr1, and the latter and transistor Tr2 is successively switched on. Consequently, it allows the current from first built-in battery 111 to flow to the whole circuit, and repeater 100 will be turned on.

On the other hand, when external power supply source terminal 110 is initially plugged in with cigarette lighter outlet cable C2, the first contact 112a corresponding with anode (positive), second contact 112b corresponding with cathode (negative) and grounding, the power is supplied through the cigarette lighter outlet cable C2. At this time, as the third contact 112c is mechanically pushed by inserted DC plug or so on, consequently releasing second contact 112b, the electrical discharge from first built-in battery 111 will be stopped (except natural discharge). When the power is supplied through the cigarette lighter outlet, the output voltage of cigarette lighter outlet, generally being 12 volt DC, needs to be stabilized to eg 6 volt, by voltage stabilizer 112d, through the cigarette lighter outlet cable C2. When the power of repeater unit 100 is initially off (transistors Tr1 and Tr2 are off), the 6-volt current does not flow to the whole circuit. Under such condition, voltage stabilizer 112d works only as a current discharge circuit and, therefore, no current flows from first built-in battery 111 to this voltage stabilizer. However, when the control signals from portable telephone terminal 300 are entered into transistor Tr1 of first main body power supply controller 112 upon receipt of a call, they work as trigger signals and transistor Tr2 is turned on. Consequently, the 6-volt power will be distributed to the whole circuit and the transmitter 100 will be turned on. For voltage stabilizer 112d, so-called power regulator element or equivalent can be used, but the invention is not limited to these.

To the contrary, when the other party to the call terminates the call and consequently, the voice signal output voltage of portable telephone terminal 300 returns to the initial condition (zero), first main body power supply controller 112 of repeater unit 100 detects the absence of said output voltage, namely, that there is no inflow of control signals. This triggers turning off the transistor Tr1 and transistor Tr2 successively. As a result, the whole power of repeater unit 100 will be turned off. In this process, repeater unit 100 automatically turns on when received a call and turns off when the communication is over.

For input attenuator 101 of repeater unit 100, a variable resistance (variable attenuator) can be used. In this case, by changing the resistance value of the variable resistance, repeater unit 100 can be suitably adapted to the voice signal output voltage, which varies depending on the type of portable telephone terminal 300.

Figure 5:
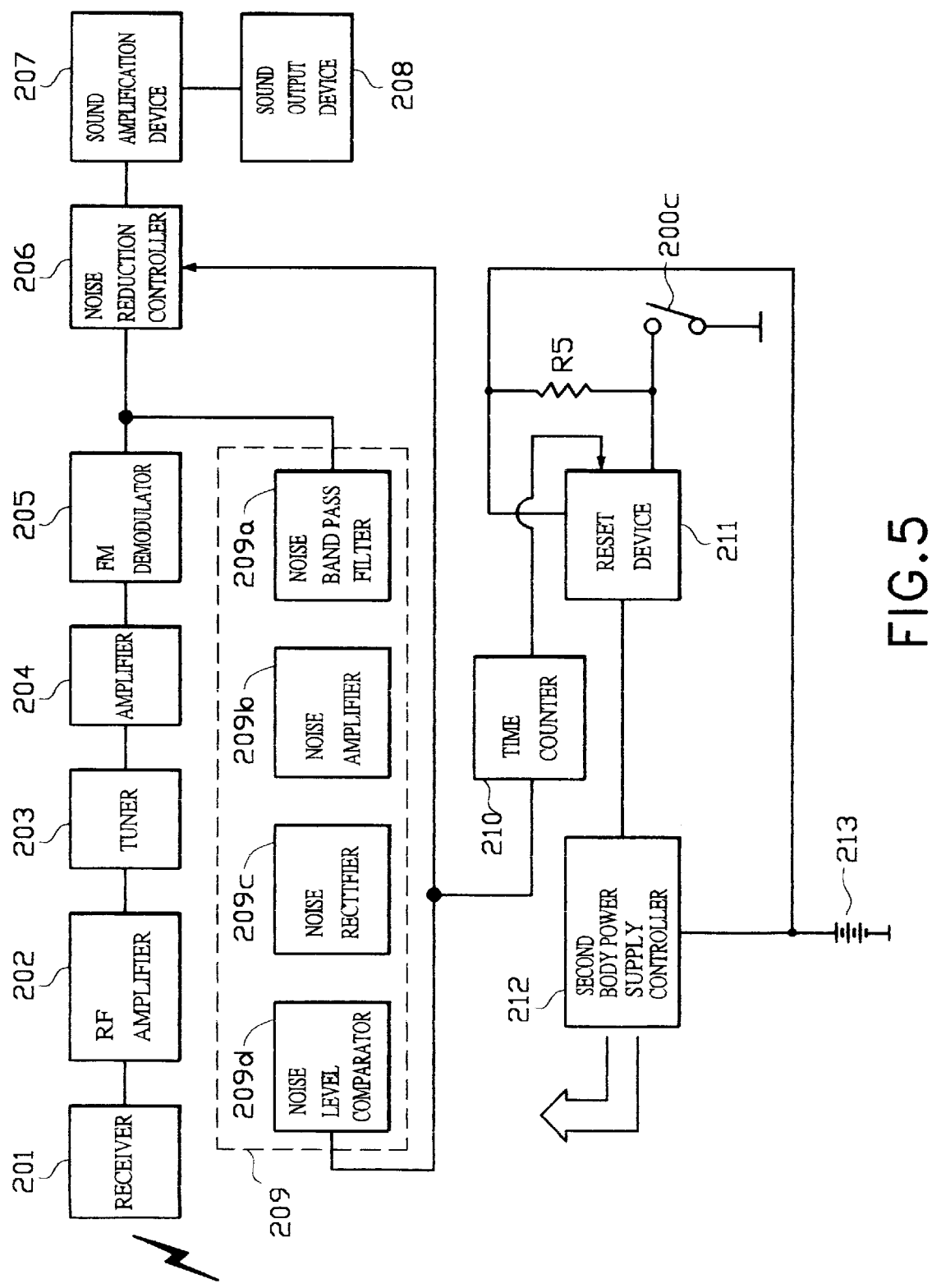
FIG. 5 is a schematic diagram of the remote receiver unit.

Now, we describe further details of remote receiver unit 200, illustrated in block diagram form in FIG. 5. Power switch button 200c is not of toggle switch type but the type which opens and closes the contact only while the push button is simply being pressed down. Suppose remote receiver unit 200 is provided with second built-in battery 213 and initially turned off. The caller presses power switch button 200c only once and then, reset device 211 turns on. As a result, second main body power supply controller 212, for which a switching transistor or equivalent can be used, will be turned on. Consequently, the power will be supplied to the whole circuit of remote receiver unit 200.

Figure 4A:
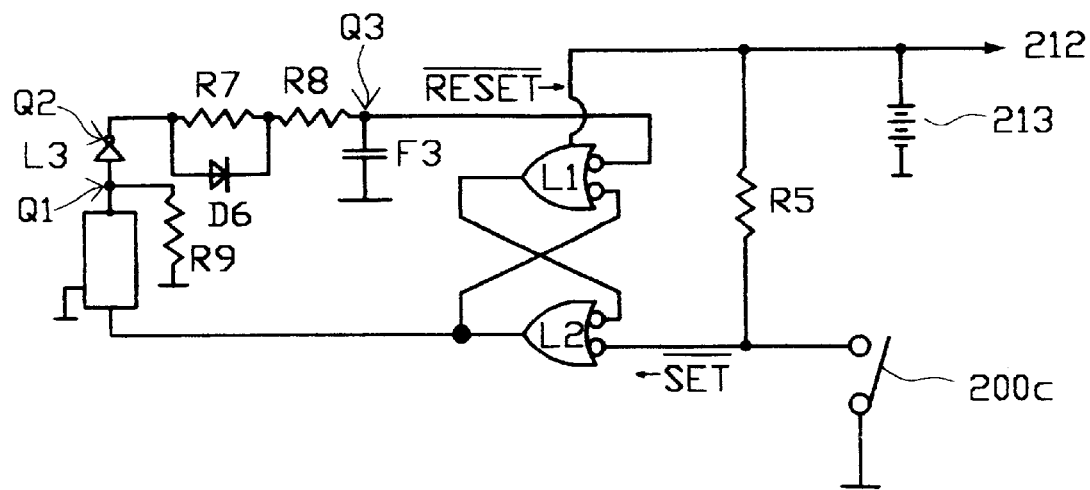
FIG. 4(A) is a schematic diagram of the reset device of a remote receiver unit.
Figure 4B:
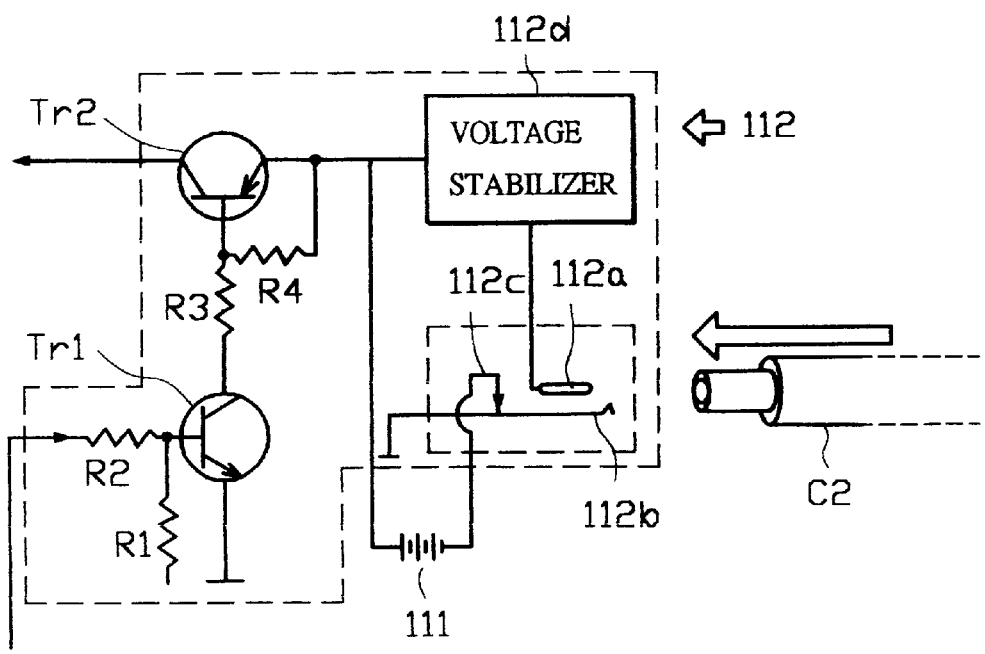
FIG. 4(B) is a schematic diagram of the first main body power supply controller of the repeater unit.

More precisely for the configuration of reset device 211, the negative logic flip-flop circuit (bi-stable multi-vibrator circuit) as shown in FIG. 4(A) can be adopted but the invention is not limited to this arrangement. In this system, flip-flop circuits (hereinafter referred to as "FF circuit"), using C-MOS type NAND gate are adopted, and SET and RESET conditions are switched over by input of low level signals.

Suppose remote receiver unit 200 is not initially provided with second built-in battery 213 (namely, no battery is provided). Under such conditions, if the caller inserts second built-in battery 213, such as dry battery, a voltage will be supplied to the FF circuit and inverter $L_3$ circuit. Immediately, $L_2$ input (low level set) is supplied with (+) voltage through $R_5$, but for $L_1$ input (low level set), (+)

voltage will be risen with a slight delay time that is determined by $R_8$, and $F_3$ time constant. This means low level reset signal was supplied to the $L_1$ of FF circuit at the initial condition, and then $L_2$ output of FF circuit becomes low, consequently keeping the power to be OFF.

Figure 8:
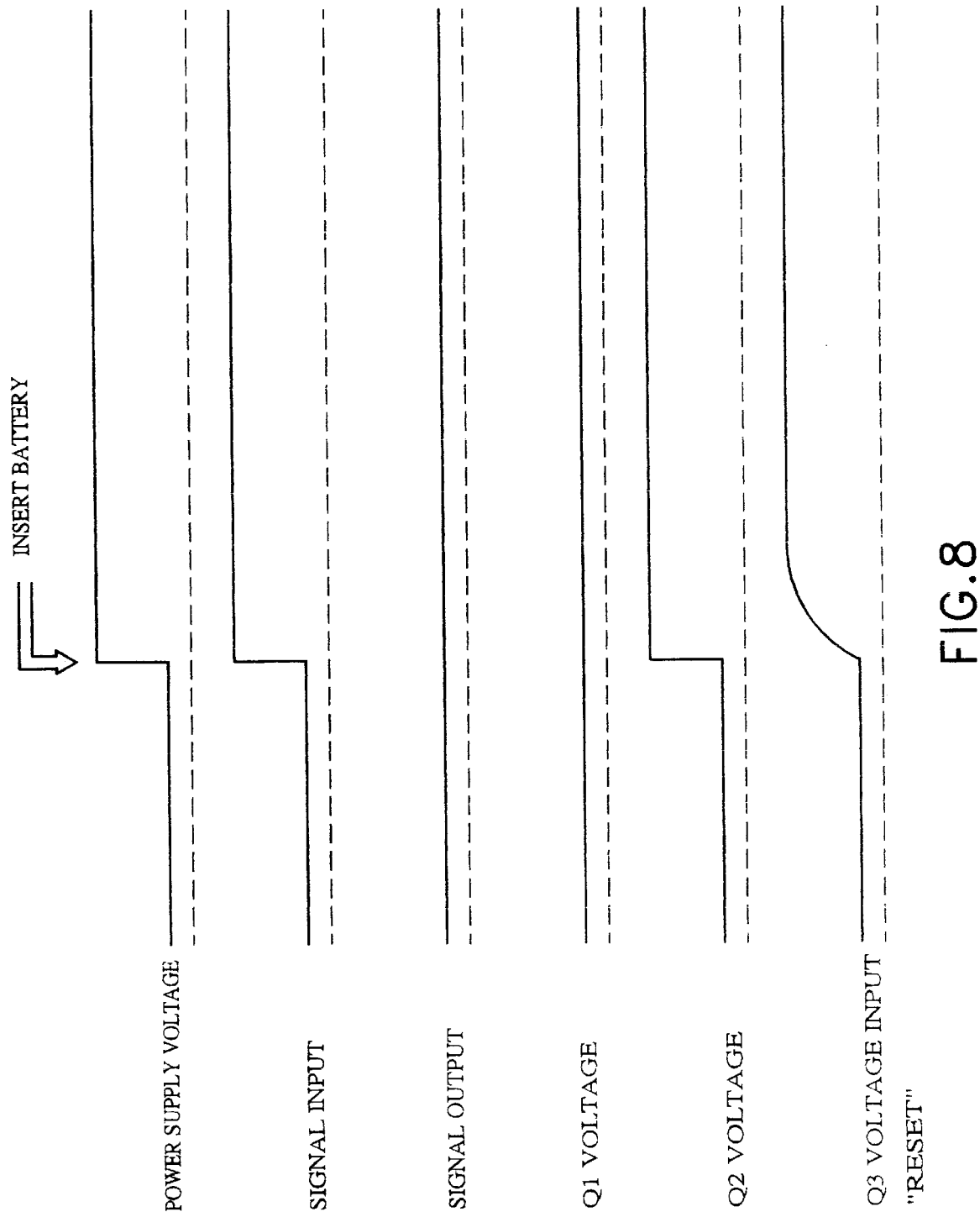
FIG. 8 is a timing diagram for the remote receiver unit in the case where a built-in battery is inserted-therein.
Figure 9:
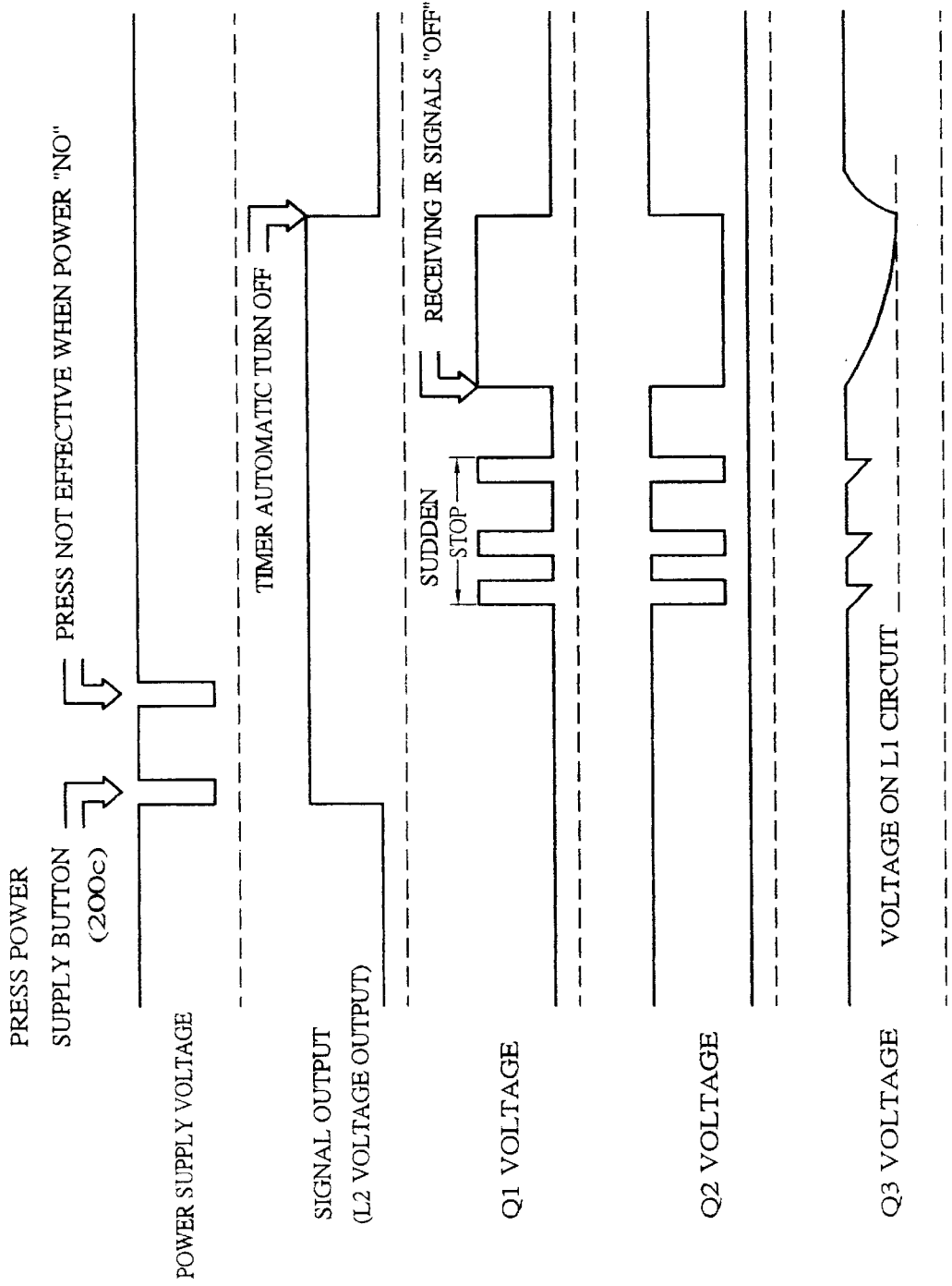
FIG. 9 is a timing diagram for the remote receiver unit from switching on of the power supply to automatic switch off after communication.

Namely, the output level is low at point $Q_1$ with resistance $R_3$ and high at point $Q_2$. The level of reset input to logical element $L_1$ turns to high after the passage of time from the turning on of the power, by time constant expressed by the product of resistance $R_8$ and condenser capacitance $F_3$ under the voltage at point $Q_2$. The time chart of the voltage at this moment is shown in FIG. 8.

Suppose portable telephone terminal 300 received a call. Then, infra-red signals relating to the voice signals will be transmitted from repeater unit 100 above. When the driver presses down power supply button 200c only once, set signal will be activated to FF circuit, and FF circuit will turn on. Battery power 213 supplies the power to the whole circuit. Under such condition, if the infra-red signals are strong enough, low level output will be generated at point $Q_1$. When the level of received infra-red signals becomes lower than a certain level, the output level at point $Q_1$ turns high. If the output level is higher than a certain level, the output level at point $Q_1$ turns to low and at $Q_2$ to high, and the reset input on the FF circuit remains to be high. Consequently, the power to the whole circuit remains to be ON.

More concretely, by simply pressing power supply button 200c, the low level signals will be entered as set signals into the logical element (NAND element) $L_2$ on the FF circuit. On a FF circuit, once the set signals are entered, even if the power supply button is pressed down again, it will not be effective until the FF circuit condition is reversed after reset signals are entered into the logical element (NAND element) $L_1$. Under such condition, the voltage of second built-in battery 213 is constantly impressed on the FF circuit, as logical elements (NAND elements) $L_1$ and $L_2$ on the FF circuit are of C-MOS type, the energy consumption is negligible, even when the power of remote receiver unit 200 is off. Logical elements (NAND elements) $L_1$ and $L_2$ can be a combination of separate FET of C-MOS type or a part of an IC.

Under such conditions, even if power supply button 200c is pressed down, as no other signals than set signals are accepted, logic conditions on the FF circuit will not be reversed. Further, if the flow of infra-red signals related to the receiver call is momentarily stopped, the level of voltage at point $Q_1$ changes from low to high level, and that at point $Q_2$ is reversed from high to low. However, due to the existence of the time constant $(R_7+R_8) F_3$ $(R_7>>R_8)$ at point $Q_3$, the speed of lowering voltage at $Q_3$ slows down, and momentary high voltage at $Q_1$ is not sufficient to cut the threshold voltage of FF circuit. As a result, the reset signals will not be recognized to have been entered. Further, when signals are recovered, although the level becomes low at $Q_1$ and high at $Q_2$, the change in supply of voltage in this direction instantly charges $F_3$ (because $R_7>>R_8$), as the time constant at $Q_3$ changes to $R_8F_3$ due to $D_5$ which is existing in parallel to $R_7$, the level of momentary lowering (within the predetermined period) of the strength of received signals will not be accumulated.

On the other hand, when the flow of received infra-red signals related to the call is completely stopped and the voltage at point $Q_3$ becomes lower than that of the resetting threshold to be set by the time constant $(R_7+R_8) F_3$, after a passage of time, a reset signal (low) is recognized to have been entered. As a result, the FF circuit will be reset and the power of the whole circuit will be turned off.

Further, when power supply button 200c is pressed down under the condition where no infra-red signals are initially received, the voltage at point $Q_3$ will decrease at the constant to be determined in formula $(R_7+R_8) F_3$, the voltage being high at point $Q_1$ and low at point $Q_2$ as there is no incoming signals. At the time when the input voltage $Q_3$ to $L_1$ on the FF circuit decreases to the point judged to be low level, the FF circuit will be reset and the power switch will be turned off. Consequently, timer-set period is determined by such constant. However, the timer-set period does not need to be exactly the same period of time as determined by the time constant $(R_7+R_5) F_3$, but may well be a period of time in some proportion to the time constant.

Secondly, the optical receiver 201 of remote receiver unit 200 is designed to receive infra-red signals representative of the voice signals transmitted from the other party to the call by the infra-red transmitter 106 of repeater unit 100. For this function, photodiode elements (infra-red photodiode and pin photodiode) and so on, can be used in reverse bias but the invention is not limited to them. When infra-red signals are entered into optical receiver 201, the received signals are amplified by an amplifier 202 which has sufficient gain. For the amplifier 202, so-called RF amplifier can be used, but the invention is not limited to this. Tuner 203 is a filter circuit which passes only predetermined RF wave signals. In this mode of application, "predetermined frequency" is set at 0.5 MHz, but the invention is not limited to this.

The signals passed through the amplification device 204 are further amplified and their amplitude is controlled to a certain value by the limiter circuit. Their frequency modulation signals are returned back to voltage amplitude signals by FM demodulation device 205 at the later stage of the process. The voltage amplitude signals, being low frequency wave audio signals, are, then, amplified by sound amplification device 207 and output as voice signals through the sound output device 208, such as speaker, etc. In this way, the caller (driver) can hear the sound of the voice of the other party to the call.

In the case where the flow of infra-red signals is stopped during the communication or any obstacle obscures the infra-red beam, as infra-red ray communication using frequency modulation is adopted in this system, the input level related to the received call will be remarkably lowered. As a result, any noise elements of the output from frequency demodulation device 205 outside the voice band becomes large. In order to suppress such noise elements, the noise level comparator 209 and noise reduction controller 206 are provided to make the sound clearer by suppressing such noise elements.

More precisely, noise signals output from frequency demodulation device 205 are, first entered into noise band pass filter 209a, and then noise amplifier 209b. After being amplified here and rectified by noise rectifier 209c, the noise signals become direct current voltages (when the noise signals are analyzed to be large, the direct current-output voltage level of the rectifier which is not shown in the figure will increase). The direct current voltage is compared to the predetermined standard voltage (in this mode of application, it is determined at 2.6 volt) by noise level comparator 209d). The noise level comparator 209d is so-called comparator (voltage comparator) and Schmidt trigger circuit, op-amplifier or equivalent can be used, but the invention is not limited to them. Here, when the direct current voltage related to noise signals exceeds the standard voltage, the output of noise level comparator 209d will be impressed onto noise reduction controller 206, then, the latter is activated to lower (or cut) the level of noise signals. Noise reduction controller 206 is an attenuator circuit which is activated by the output voltage of noise level comparator 209. As a result, the caller can hear a clear sound, with the noise peculiar to the frequency modulation or FM communications, etc, being suppressed or cut at the time of absence of signals. In this way, remote receiver unit 200 can establish a squelch circuit in the frequency demodulation by noise level comparator 209 and noise reduction controller 206.

In this paragraph, we explain the automatic switch-off mechanism of remote receiver unit 200 after the termination of communication, referring to FIG. 5 once more. As mentioned above, when the receiving level of infra-red signals is remarkably lowered due to any obstacle in the way of infra-red ray transmission, or when it becomes nil as a result of turning off of repeater unit 100 after the termination of communication, part of output signals from noise level comparator 209*d* are entered into time counter 210. When the infra-red ray transmission is discontinued, namely, the noise level becomes high and the output flow from noise level comparator 209*d* is continued for a certain period of time, time counter 210 detects the continuance based on the expiration of the timer-set period (eg 10 minutes) and sends out signals to reset device 211, more precisely, to logical element (NAND element) $L_1$ of reset device 211 (see FIG. 4(A)). As reset device 211 is a FF circuit, the entered signals turn into reset signals.

Consequently, the level of basic potential of the switching transistor of second main body power supply controller 212 becomes high and the power supply to the whole circuit of remote receiver unit 200 connected to the collector, will be stopped. The output voltage of the collector will be supplied as the power source to the whole circuit, excluding second main body power supply controller 212. In this process, remote receiver unit 200 will be automatically turned off after a set time from the termination (or interruption) of the communication.

Here, we describe further details on timer counter 210. The time counter 210 is a time circuit, which judges the duration of existence/absence of infra-red signals sent from noise level comparator 209*d* based on the time constant to be determined by the product CR of the circuit (capacitance of condenser and resistance to be used). It counts the duration of output from noise level comparator 209*d* indicating that there is no received infra-red signals, and sends reset signals to reset device 211, only when such duration exceeds the predetermined period. In FIG. 4, for example, time counter 210 and reset device 211 is operated, utilizing the input property of FF circuit of C-MOS. Assuming noise level comparator 209*d* sends high level signals when there is no output signal, and low level signal when there is, when the flow of high level noise signals from noise level comparator 209*d* as $Q_1$ output as mentioned above continues, the output from inverter $L_3$ maintains low level output and electrical potential at $Q_3$ will continue to decrease slowly at time constant $(R_7+R_8) F_3$. Further, as the potential at point $Q_3$ is the reset input to FF circuit of reset device 211, the FF circuit judges there was a reset input when the threshold voltage of C-MOS gate of $L_1$ was cut, and reverses the circuit condition. Reset device 211, then, turns off second main body power supply controller, and the reset movement will turn to FF. In the above explanation, the circuit adopting C-MOS gate for time counter was used, but other types of timer, such as micro-computer timer, dedicated timer IC or equivalent can be also used.

Further, when power supply button 200*c* of remote receiver unit 200 is pressed down, while no infra-red signal is received from repeater unit 100, the condition of reset device 211 (FF circuit) reverses and remote receiver unit 200 is turned on. However, as no infra-red signal is received, the noise often peculiar to the frequency modulation techniques is suppressed (or cut) by noise reduction controller 206, etc. In the same process and after the expiration of the timer-set period (eg ten seconds), remote receiver unit 200 is turned off by reset device 211 and second main body power supply controller 212. As regards the power supply button, it is preferable to design it in a form as large as possible so that the caller can easily locate it.

Remote receiver unit 200 is not turned off immediately when the flow of received infra-red signals was interrupted but turned off with a certain delay of time. Such delay is designed to prevent a sudden disturbance of communication by momentary interruption of infra-red ray reception (due to the deviation of direction caused by the vibration of car, change in facing direction of the caller, and obstacles on the infra-red reception route, and so on).

Figure 6:
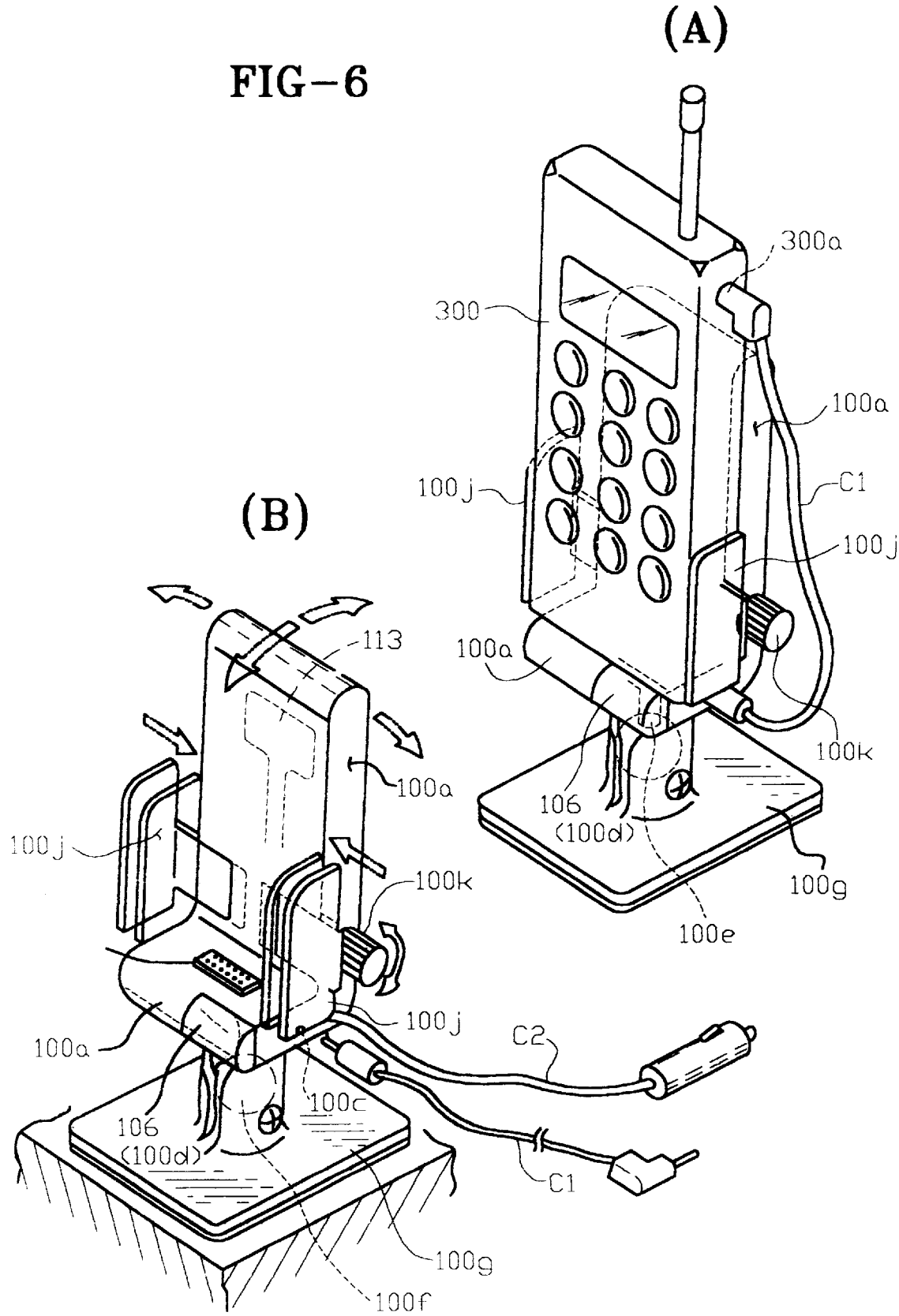
FIG. 6(A) shows the portable telephone terminal fitted in a repeater unit in accordance with a second embodiment of the invention.
FIG. 6(B) shows the repeater unit of FIG. 6(A) with the portable telephone unit removed.

In this paragraph, we explain the second embodiment of the invention relating to portable telephone communications system, in which the power to repeater unit 100 is supplied by detecting radio waves and rectifying them into direct current. Repeater unit 100 adopted in this mode of application is preferably of the type to which portable telephone terminal 300 can be attached, and more precisely of a vertically standing type as shown in FIG. 6. Repeater unit 100 in this mode of application has a built-in detection aerial on the loop of wave detector 113 at the position corresponding to the back of the built-in aerial of portable telephone terminal 300 mentioned above. Generally, when receiving a call, portable telephone terminal transmits radio waves at a certain strength (when its built-in battery has an enough power) to establish a common signal link related to the control of communications with the base station. As the radio waves are continuously transmitted during the communication, the detection aerial mentioned above detects the transmitted radio waves. The radio waves are, further, converted into direct current by a rectification circuit, and thus produced direct current will be supplied as a power source to repeater unit 100 of this invention.

Figure 7:
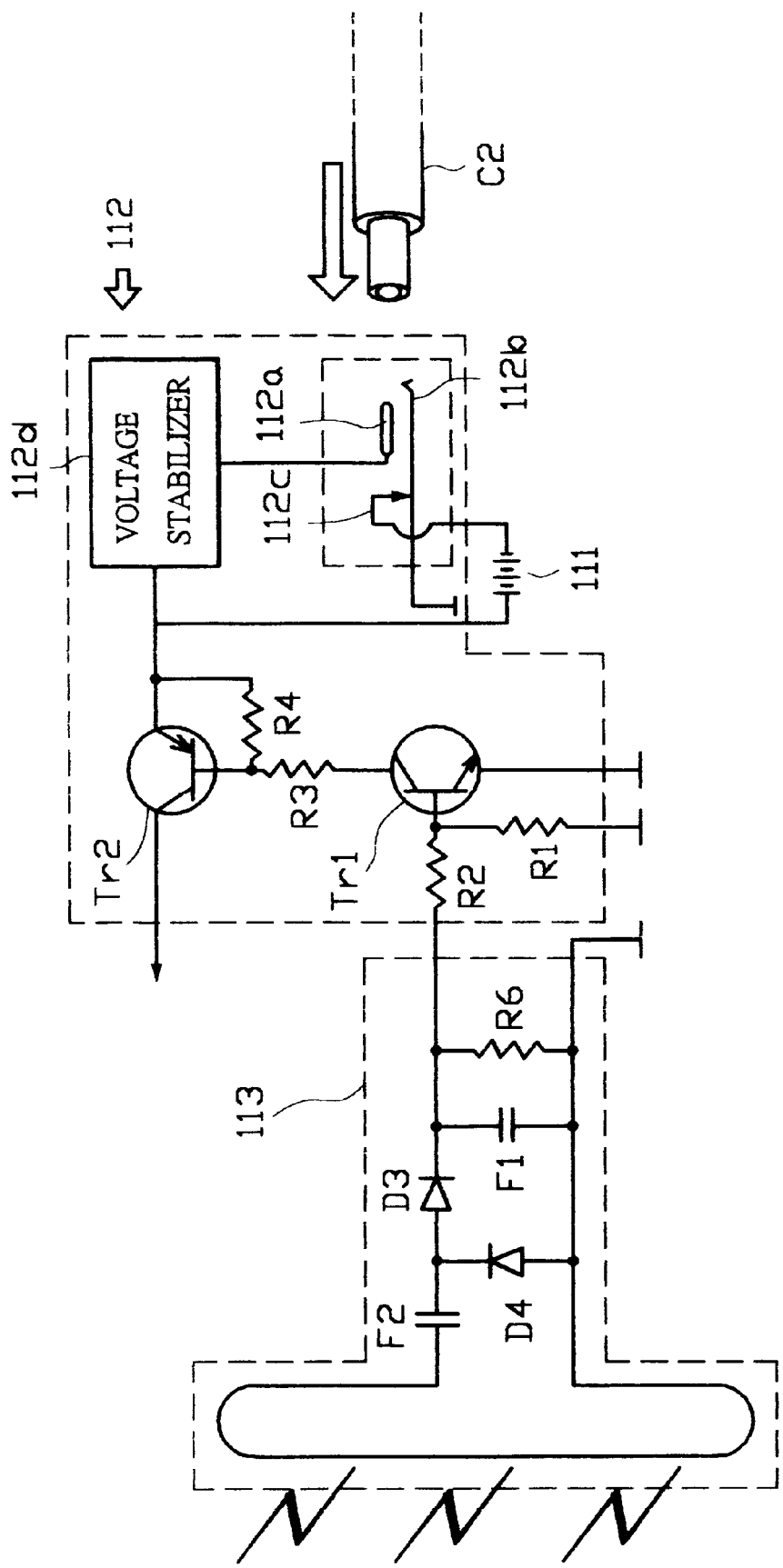
FIG. 7 is a circuit diagram illustrating the aerial and wave detector of the repeater unit in accordance with a second embodiment of the invention.

To be more precise, the radio waves received by portable telephone terminal 300 are detected by the rectification circuit of the Schottky diodes $D_3$ and $D_4$, etc of wave detector 113 shown in FIG. 7 and rectified to direct current. The direct current becomes control signals (trigger signals) as mentioned in the explanation of the first embodiment and enters first main body power supply controller 112. Consequently, the transistors Tr1 and Tr2 are successively turned on and the power which is supplied through the cigarette lighter outlet cable C2 is distributed to the whole circuit of repeater unit 100. Voice signals are transmitted from voice signal input/output terminal 300*a* to input attenuator 101 and automatic level controller 102 through cable C1 in the same way as in the first embodiment. This system has no problem also with recent type of portable telephone terminals adopting digital method where transmitted electric waves are not continuous and ON/OFF switching operation of electric waves are repeated in a multiplex system. If in the circuit of FIG. 7, the time constant determined by $F_1$, $R_6$, $R_2$ and $R_1$ is set for longer period than these intermittent cycle, modulated digital waves can also be input as direct output at Tr1.

The main body 100*a* of the repeater unit has a pair of side elements 100*j* arranged thereon. The gap between side elements 100*j* of main body 100*a* is controllable by turning a control knob 100*k*. FIG. 6(A) is the sketch of the main body when portable telephone terminal 300 is attached and the gap between side elements 100j adjusted. Further, a back board of main body 100a can be inclined backwards and forwards. It is also possible to provide telecommunication connector (RS-232C or proper interface, etc) at the bottom for the connection with portable telephone terminal.

Reset device 211 of remote receiver unit 200, which can be used both in the first and second embodiments, can be realized in the FF circuit of positive logic NOR, because the difference between the two is only a matter of whether it is negative logic or positive logic. Further, reset device 211 can also be realized with dedicated set/reset FF circuit IC without using logic gate (such as J–K FF with set/reset, etc).

In the portable telephone communications system of this invention, FM radio waves can be used instead of infra-red ray. The shape of repeater unit 100 and remote receiver unit 200 is not limited to those shown in this specification and drawings in any case. Parts of the repeater unit 100 and remote receiver unit 200 in this invention can be in one tip form, using IC, LSI or equivalent. This invention is especially suitable for the use in an automobile with the power supplied through the cigarette lighter outlet, using cigarette lighter outlet cable C2. However, it is also suitable for the use in any other place, such as in the house, office, factory, etc. As regards the cigarette lighter, outlet cable C2 and AC/DC adapter (with cable) these can be conventional products already on the market, but they need not to be standardized products.

In the systems described above, as well as using frequency modulation for remote receiver unit 200, the noise which is generated when there is no received signal and arising with the frequency modulation techniques is also utilized to discriminate and compare and trigger automatic and assured turning off of the power when the communication is over.

This will save car drivers the trouble of switching operation of power button for electricity saving and enables one to dramatically reduce the time of one-hand driving operations and taking their eyes off the road by car drivers. Further, with this system, as the power of remote receiver unit 200 is automatically turned off without fail when there is no communication, the electricity will be saved and at the same time the frequency of battery change of remote receiver unit 200 will be reduced, which will as a result save the caller trouble of maintenance.

Further, such automatic and assured power switching system triggered by voice output signals from the portable telephone terminal will be effective for electricity saving, as the power switch remains off when there is no communication, even in the case where the power to main body is supplied from built-in battery. It is also effective for saving the caller the trouble of switching operation of portable telephone, which will dramatically reduce the time of one-hand driving and also prevent car drivers from taking their eyes off the road while driving.

In addition, the noise peculiar to FM can be cut off immediately after the communication is over. Consequently, the caller (driver) will be released from the nuisance of noise without waiting for the power to remote receiver unit 200 turned off after a certain period and freed from the nuisance of high volume output noise during driving a car, which will be helpful for car drivers to continue a safe driving.

What is claimed is:

1. A portable telephone communications system having a portable telephone terminal and a repeater unit, and a remote receiver unit, wherein:

the repeater unit includes a main power supply control device which includes detection means triggered by a signal from the telephone terminal arising on receipt of an incoming call, frequency modulating means for receiving signals representative of a remote caller's voice from the telephone terminal, and converting them into a frequency modulated signal, and including infrared transmission means for transmitting said frequency-modulated signal to the remote receiver unit;

the remote receiver unit includes an infra-red receptor, demodulation means and means for outputting the demodulated signals as audible voice signals, and further comprises a noise level comparator which compares the voltage of noise generated when no infra-red signals are received with a predetermined level and delivers an output signal when said voltage exceeds the predetermined level, and a time counter which outputs a reset signal when the output from the noise comparator has been generated for a predetermined time interval, and a second power supply control device which controls the power supply to the remote receiver unit, and is arranged to switch off the power on output of a reset signal from the time counter.

2. A portable telephone communications system according to claim 1 further comprising a noise reduction control means in the remote receiver unit, triggered by the output signal from the noise comparator.

3. A portable telephone communications system according to claim 1 wherein the main power supply control device comprises comparator means to compare the voltage of signals from the telephone terminal with a predetermined voltage, and when said voltage exceeds the predetermined voltage as occurs on receipt of an incoming call to output said triggering control signal.

4. A portable telephone communications system according to claim 3 wherein the main power supply control device is adapted to switch off power supply to the repeater unit on termination of triggering control signals as occurs when a call is finished.

5. A portable telephone communications system according to claim 1 wherein the receiver unit includes a reset device comprising a logic controller adapted not to provide reset signals to said second power supply control device if infra-red signals are being received.

6. A portable telephone communications system according to claim 5 wherein the logic controller is adapted to provide a reset signal to said second power supply control device when the infra-red signals stop for a predetermined period, to thereby switch off the power supply.

7. A portable telephone communications system according to claim 1 wherein the repeater unit includes an input signal attenuator, an audible signal level controller and an amplitude controller.

8. A portable telephone communications system according to claim 1 wherein the repeater unit is provided with a wave detector which detects emitted radio waves from the portable telephone terminal and rectifies them into a direct current signal, the first main power supply being triggered by the voltage output from the wave detector.

9. A portable telephone communications system, comprising a repeater unit, which converts voice signals output at a portable telephone terminal into infra-red signals by frequency modulation and transmits them to the terminal on the other end of the communication, and a remote receiver unit which receives the infra-red signals, converts them back into voice signals by the demodulation and outputs them as an audible signal wherein the repeater unit has a voice input device to receive caller's voice, and a first main body power supply control device which detects the receipt of calls at the portable telephone terminal being triggered by control signals from the portable telephone terminal, and supplies electrical power to the repeater unit according to the detection results, the remote receiver unit including a noise level comparator which compares the voltage of noise elements outside the voice band generated when no infra-red signals are received with that of a predetermined voltage level, and a time counter which outputs reset signals when there is a continuous flow of outputs from the noise level comparator for a period longer than a predetermined period, a reset device whose logic conditions invert upon the input of signals from the time counter, and a second main body power supply control device which controls the power supply to the remote receiver unit.

10. A portable telephone communications system according to claim 9 characterized by the provision of a noise reduction controller in the remote receiver unit adapted to reduce or cut the noise arising through the frequency modulation, and being triggered by the output current from the said comparator.

11. A portable telephone communications system, comprising a repeater unit, which converts voice signals output from a portable telephone terminal into infra-red signals by frequency modulation and transmits them to the terminal on the other end of the communication, and a remote receiver unit which receives the infra-red signals, converts them back into voice signals by the demodulation and outputs them as an audible signal, wherein the repeater unit has a voice input device for receiving the caller's voice, a wave detector which detects transmitted radio waves from portable phone and rectifies these into direct current, and a first main body power supply control unit which detects the receipt of calls at the portable telephone terminal, being triggered by the voltage output from the wave detector, and supplies electrical power to the repeater unit according to the detection results, the remote receiver unit having a noise level comparator which compares the voltage of noise elements outside the voice band generated when no infra-red signals are received with that of predetermined voltage level, and a time counter which outputs reset signals when there is a continuous flow of outputs from the noise level comparator for a period longer than a predetermined period, a reset device whose logic conditions invert upon the input of signals from the time counter, and a second main body power supply control device which controls the power supply to the remote receiver unit.

12. A portable telephone communications system according to claim 11 characterized by the provision in the remote receiver unit of a noise reduction controller adapted to reduce or cut the noise arising through the frequency modulation, being triggered by the output current from the comparator.

* * * * *

UNITED STATES PATENT AND TRADEMARK OFFICE
CERTIFICATE OF CORRECTION

PATENT NO. : 6,154,663
DATED : November 28, 2000
INVENTOR(S) : Takeshi Itamochi

It is certified that error appears in the above-identified patent and that said Letters Patent is hereby corrected as shown below:

Title page:

Item [75] Inventor: Replace "Takeshi Itamochi, Fukuoka, Japan with
-- Takeshi Itamochi, Fukuoka City, Japan`--

Item [30] Foreign Application Priority Data: Please add
-- April 20, 1998    (JP) ...........................10-109981 --

Signed and Sealed this

Fourteenth Day of August, 2001

*Attest:*

NICHOLAS P. GODICI
*Attesting Officer*    *Acting Director of the United States Patent and Trademark Office*